Oct. 11, 1966 J. P. EVERETT 3,278,687

FOUR-LAYER DIODE NETWORK FOR IDENTIFYING PARTIES ON A TELEPHONE LINE

Filed July 19, 1963 2 Sheets-Sheet 1

INVENTOR

JOHN P. EVERETT

BY Watson, Cole, Grindle & Watson

ATTORNEYS

INVENTOR
JOHN P. EVERETT

BY *Watson, Cole, Grindle & Watson*

ATTORNEYS 3,278,687

FOUR-LAYER DIODE NETWORK FOR IDENTIFYING PARTIES ON A TELEPHONE LINE

John P. Everett, Charlottesville, Va., assignor to Stromberg-Carlson Corporation, a corporation of Delaware Filed July 19, 1963, Ser. No. 296,168
2 Claims. (Cl. 179—17)

This invention relates to telephone system improvements and more particularly, to means for identifying automatically a calling station on a party line.

Automatic telephone systems employ identification means for tolling charges on a line as calls are made. However, on party lines it is further required to distinguish between the parties to assure that proper charges are made. Thus, proposals have been made for use of test voltages and voltage responsive circuits for identifying each party line station.

This invention has as a general object to provide improved identification means for use in isolating different party line subscribers.

Features of the present invention include compatability in size, impedance and operating voltage with standard telephone equipment and systems. In general, acceptable telephone equipment must not be subject to wear and must be simple and reliable in operation to provide long service without maintenance. Also, any equipment for use in various locations such as different stations on a party line should be standardized, and preferably should not require complex changes in wiring or components at each station. Otherwise, installation errors could be introduced and any equipment changes would have to be carefully checked out. Also, it is desirable to provide simplified interrogation of the party line to avoid complexity or radical change of central office equipment in automatic systems.

Thus, another object of the invention is to provide simple identification means for a party line subscriber station which may be readily interrogated.

A further object of the invention is to provide a standardized unit that needs no routine maintenance.

A still further object of the invention is to provide identification means operable with test voltages no higher than the 100 to 150-volt area generally used as test signals in telephone switching systems.

This invention provides a solid state voltage responsive unit which may be polarized for different voltage polarities. In an illustrative embodiment of the invention, one such unit will suffice to identify each party on a two party telephone line with application of a single low voltage test signal of a selected polarity. The solid state voltage responsive unit comprises a 4-layer diode which has characteristics such that it blocks the flow of current as long as the voltage across its terminals is lower in value than its rated breakdown voltage. The conduction may be terminated after breakdown by interruption of the circuit. Thus, except for the testing period, the identification unit presents a high impedance to the telephone line.

Figure 1:
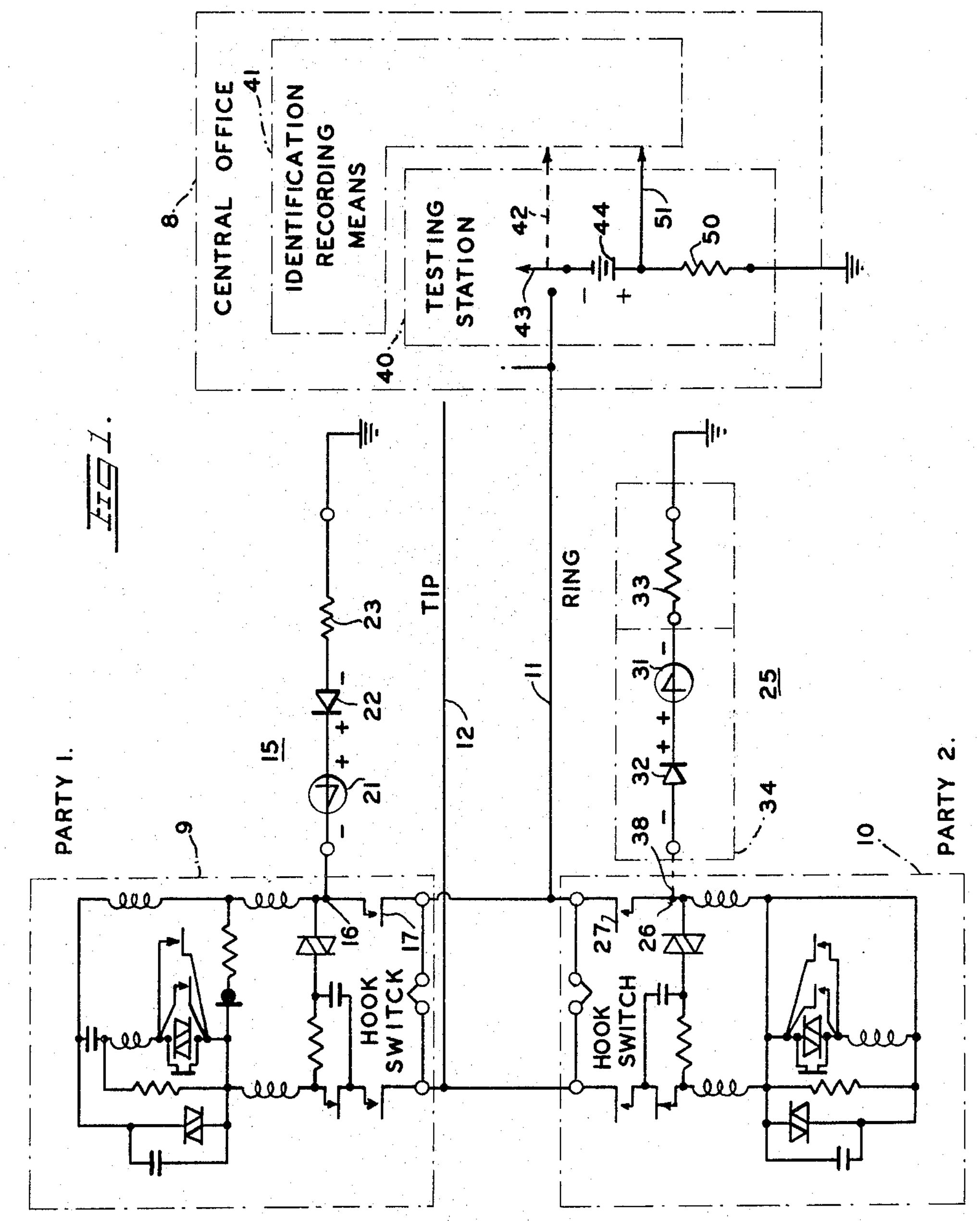
Figure 2:
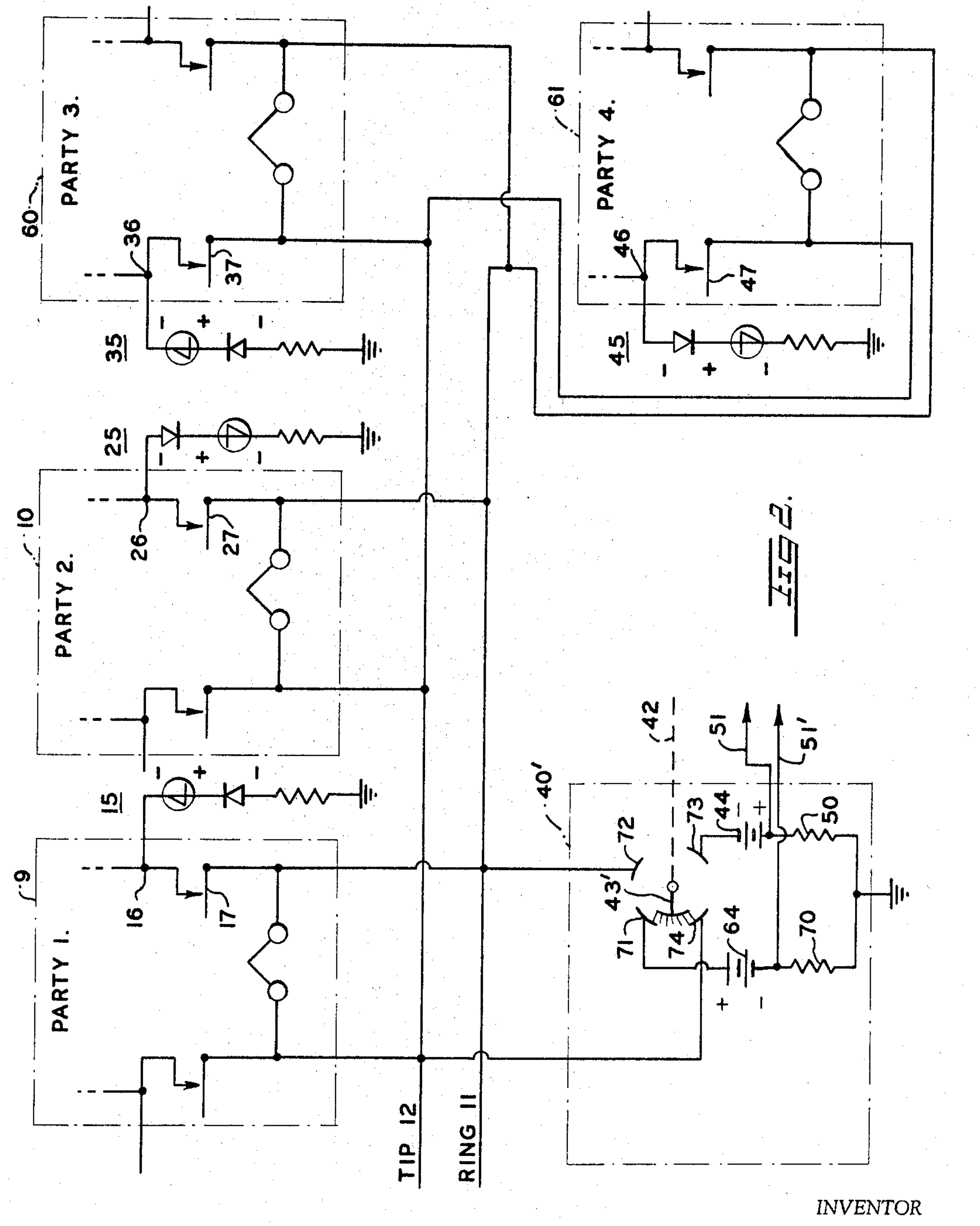

An embodiment of the invention is illustrated in the accompanying drawing, in which:

FIGURES 1 and 2 are respective schematic diagrams of two- and four-party line telephone systems embodying the invention.

The telephone system illustrated comprises a central office installation, shown in block form 8, together with telephone sets at two subscriber stations 9 and 10 of a party line, both coupled to respective ring and tip party line conductors 11 and 12. Also, a ground return circuit is identified. Each of the subscriber stations represents a conventional installation with standard equipment, which is shown for the purpose of illustrating that modifications are unnecessary for use with the identification means afforded by the invention. Thus, only those elements operable with the identification means are referred to specifically.

The identification network 15 is coupled at the subscriber station 9 to the terminal 16, which is the ring conductor 11 of the line when the hook switch 17 is closed as the hand set (not shown separately) is lifted. Thus, terminal 16 is only connected to the central office 8 when the party at station 9 is on the line.

Identification network 15 comprises a 4-layer diode 21, a conventional semi-conductor diode 22 and a current limiting resistor 23. The 4-layer diode 21 serves to block the flow of current through the identification network 15 when the hook switch 17 is closed until an interrogation voltage of sufficient magnitude and proper polarity is impressed at terminal 16. The conventional diode 22 is a polarizing device serving to protect the 4-layer diode 21 against voltages of reverse polarity, thus serving to make the network polarity sensitive as well as magnitude sensitive. Current limiting resistor 23 has a value limiting current flow through the network to a value such that the 4-layer diode is extinguished readily. Typical circuit construction and operating conditions for the network are as follows:

| | | |
|---|---|---|
| 21—4-layer diode breakdown potential | volts | 100 |
| 23—Resistance | ohms | 3000 |
| 22—diode type | | PS5488 |
| Extinction current level | ma | 13 |
| Testing current level at breadown | ma | 36 |

Identifying network 15 for station 9 has the 4-layer diode poled negatively at terminal 16 so that it is responsive to negative test voltages. Thus, diode 22 is poled with its cathode toward terminal 16 to block current flow in the presence of any positive test voltages.

Conversely, identification network 25, which is optionally connected to terminal 26 of station 10, is responsive to positive test voltages and excludes negative pulses because of the polarity orientation of the 4-layer diode 31 and conventional diode 32. Thus, the two diodes 31 and 32 may be connected together as a standardized component 34 for use with either polarity and may either include or exclude the current limiting resistor 33.

In operation with a two party line, only one identification network 15 is required in a simple test procedure to identify the parties. Thus, identification network 25 is optional as indicated by the broken conductor 38 leading to terminal 26. A simplified typical test procedure is illustrated in the central office installation 8 by the switch 43 at station 40. Thus, in time synchronization with operation of identification recording means 41 (as illustrated by dotted line 42), the test switch 43 is closed to establish a negative test signal as indicated by battery 44 on the ring conductor 11.

When hook switch 17 at station A is closed, current flows through identification network 15. However, when the hook switch 27 at station 10 is closed no current will flow. Thus, the calling party is identifiable with current responsive means such as resistor 50 at the testing station 40, which serves on lead 51 to provide a signal to the identification recording means 41 enabling correlation of tolls to the proper party line.

In order to assure that conduction of the identifying network is extinguished, because of the property of the 4-layer diode, that once broken down it continues to conduct until current is substantially reduced, some precaution need be taken to remove the conductive low impedance network from the line after the test period. When switch 43 is opened, the battery 44 is disconnected in the shown embodiment to remove current flow. The current limiting resistor 23 prevents small current values due to transients or unbalances on the line from maintaining the network in a conducting condition.

As thus illustrated, only one identification network 15 is necessary for a two party line. However, for a fail-safe identification which provides positive identification of both parties, the network 25 may be similarly tested by a sequentially introduced positive test voltage on the ring conductor 11 to require a corresponding current flow for either party. It is evident that this network approach may be extended to a greater number of parties on the line by introduction of permutations and combinations of different voltage levels and polarities.

Typical of such installation, the identifying networks may be installed on either the tip or ring conductors to obtain greater versatility in the number of stations identifiable. Thus, FIGURE 2 typifies a four party line installation, where party 3 station 60 and party 4 station 61 are added along with corresponding identifying networks 35 and 45. These latter networks 35 and 45 are connected through alternate hook switch contacts 37 and 47 respectively, to terminals 36 and 46 at the station telephone sets. These are connected to the tip conductor 12 when the hand set is removed, thereby identifying the respective calling party on the line. Note that identifying networks 15 and 35 are connected for negative testing and networks 25 and 45 are connected for positive testing.

In this embodiment also simple switching means is employed at the modified testing station 40'. In addition to the negatively poled battery 44, with its corresponding current detecting resistor 50, a positively poled battery 64 is provided, with its corresponding current detecting resistor 70. Thus, a four position switch 43' is provided with a rotor wiper arm that successively contacts and bridges the four stator terminals 71, 72, 73 and 74. The rotor is synchronized with the identification recording means as shown by the dotted connection 42 so that the proper parties will be recognized at either of the output resistors 50 or 70 through corresponding test leads 51 and 51'.

In operation, assume the wiper arm of switch 43' contacts terminals 74 and 71 to test tip line conductor 12 with a positive test. Also, asume party 4 is on the line for purpose of example. The tip test positive will find identifying networks 35 and 45 at stations 60 and 61 of parties 3 and 4 in circuit, and will test a current flow for party 4.

Now the rotor of switch 43' may move in a clockwise direction to close terminals 71 and 72 to apply positive potential to ring conductor 11. This will find identifying networks 15 and 25 in circuit, but no current will flow since the hook switches are not actuated. This indicates party 2 is not on the line. Similarly, connections of terminals 72 and 73 will test the ring conductor 11 for a negative voltage and will indicate party 1 is not on the line. To complete the cycle, terminals 73 and 74 will be connected to test the tip conductor 12 negatively, thereby indicating party 3 is not on the line.

It is evident from the foregoing illustrations that the identification network afforded by the invention permits a simplified identification of party line callers and is in all respects compatible with the requirements of existing telephone systems. Accordingly, those features of novelty which represent the nature of the invention are defined with particularity in the following claims.

I claim:

1. In a telephone system with a central office and at least one party line extending to a plurality of at least two telephone sets each having a hook switch operated by a hand set and coupled at individual stations along the line to tip and ring conductors with a ground return path, the improved identifying network designating those parties using the line comprising in combination, identical ringing circuits at all stations, a D.-C. conductive network designating all but one of the sets and each comprising the series connection of a resistor, a rectifier diode and a four-layer threshold diode, each network uniquely determined by a combination of D.-C. conductive direction and connection to only one of the tip and ring conductors by switching means comprising the hook switch of the telephone set, means at the central office connected for testing the conductors in a sequence of interrogations with test voltages of sufficient magnitude and proper polarity to cause a single one of the different unique networks to exceed the threshold of the four-layer diode and conduct when the hook switch is operated, and means in the central office detecting current flow through the conductors at each interrogation to thereby designate use of the line by the corresponding party at one of the stations having the designated polarity and line connection.

2. An identifying network connected in a telephone set with a hand set operated hook switch stationed at each party location except one, a multi-party telephone line having ring, tip and ground return conductors, the network comprising in combination, a series circuit comprising a resistor, a four-layer threshold diode and a rectifier diode connected in series circuit, a circuit connecting the network between ground and one of the other conductors by operation of the hook switch when the hand set is removed, the network at each station uniquely identifying the location by a combination of polarity of the diodes and the conductor to which the network is connected, to thereby permit identification of parties connected to the line by interrogation with a voltage of a chosen polarity and magnitude along the line.

References Cited by the Examiner

UNITED STATES PATENTS 2,855,524 10/1958 Shockley ---------- 179—18.7 X
3,005,052 10/1961 Powers ------------ 179—17.1

KATHLEEN H. CLAFFY, *Primary Examiner.*

L. A. WRIGHT, *Assistant Examiner.*